United States Patent [19]

Leezer

[11] 4,340,205

[45] Jul. 20, 1982

[54] LIFTING JACK

[76] Inventor: Max L. Leezer, 615 N. G. St., Monmouth, Ill. 61462

[21] Appl. No.: 162,527

[22] Filed: Jun. 24, 1980

[51] Int. Cl.³ .............................................. E04G 1/00
[52] U.S. Cl. .................................... 254/98; 254/7 B; 269/904; 414/11
[58] Field of Search ...................... 248/354 S; 414/11; 254/2 R, 2 B, 2 C, 7 R, 7 B, 7 C, 4 R, 4 B, 4 C, 3 R, 3 B, 3 C, 133 H, 98-100, 101-103; 269/60, 904

[56] References Cited

U.S. PATENT DOCUMENTS

| Re. 15,609 | 5/1923 | Thomson | 254/102 |
|---|---|---|---|
| 634,905 | 10/1899 | McCauley | 269/60 X |
| 1,446,176 | 2/1923 | Gulledge | 254/102 X |
| 2,694,946 | 11/1954 | Vandal | 248/354 S |
| 3,095,173 | 6/1963 | Paruolo | 254/7 R X |
| 3,100,623 | 8/1963 | Pedersen | 254/98 |
| 3,540,548 | 11/1970 | Halsey | 254/7 R X |
| 3,910,421 | 10/1975 | Panneton | 414/11 |

Primary Examiner—Robert C. Watson
Attorney, Agent, or Firm—Emrich, Lee, Brown & Hill

[57] ABSTRACT

A lifting jack, particularly useful in supporting wall cabinets and the like during installation and attachment to a wall surface, includes an elongated standard, adjustable for major height adjustments, mounted on an adjustable base, and a platform secured to a fine-adjustment mechanism mounted on the upper end of the elongated standard for engaging and supporting the cabinet during installation.

7 Claims, 5 Drawing Figures

U.S. Patent  Jul. 20, 1982  Sheet 1 of 2  4,340,205
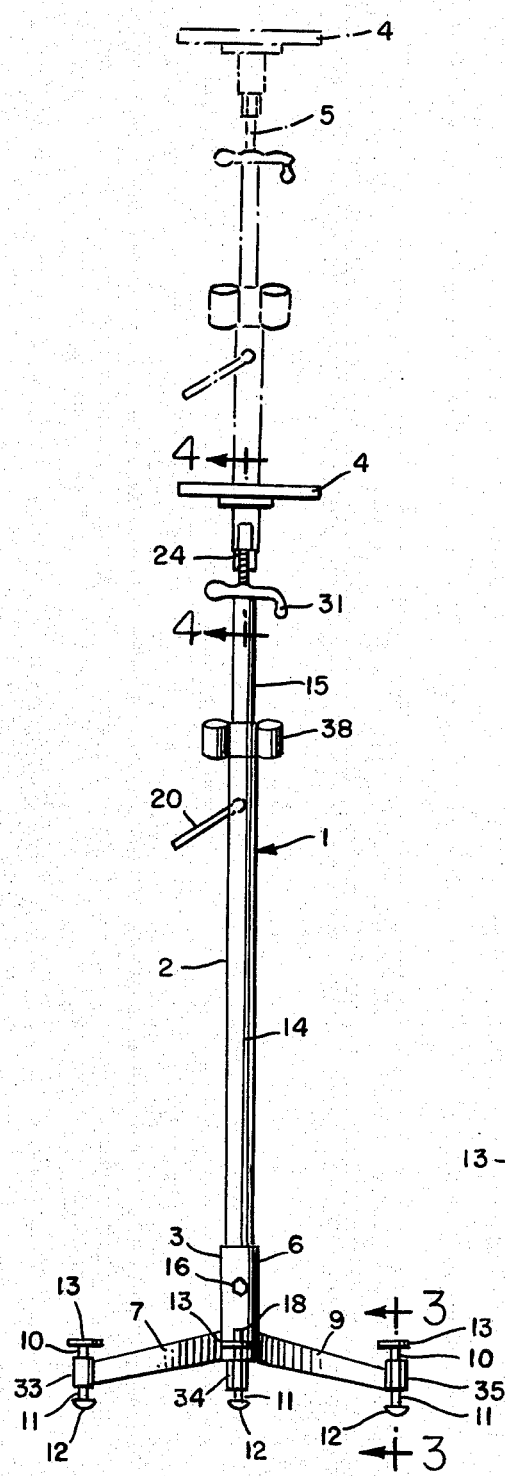
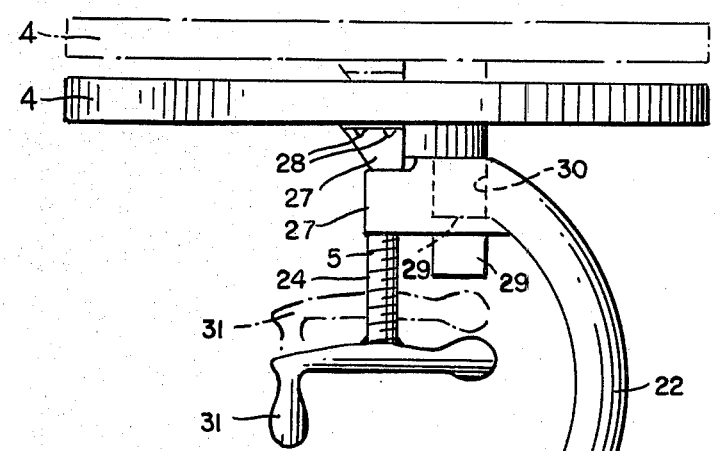
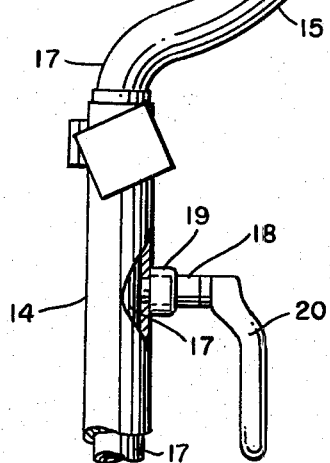
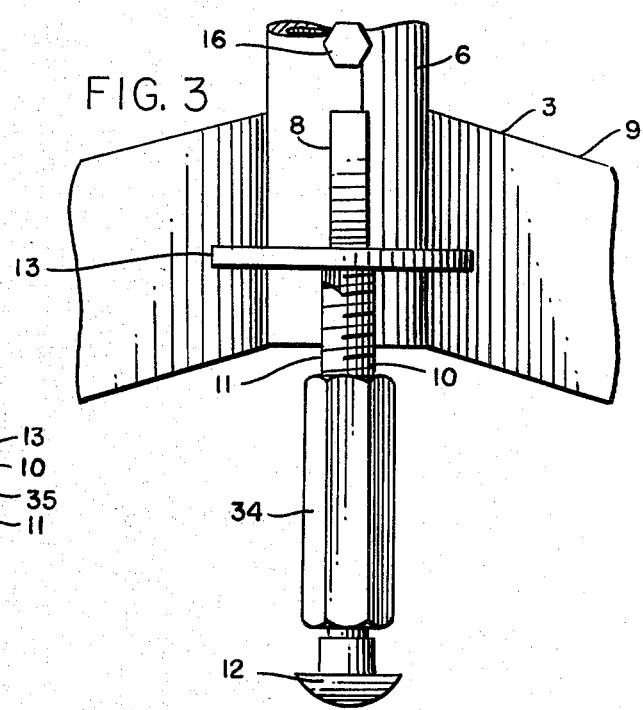

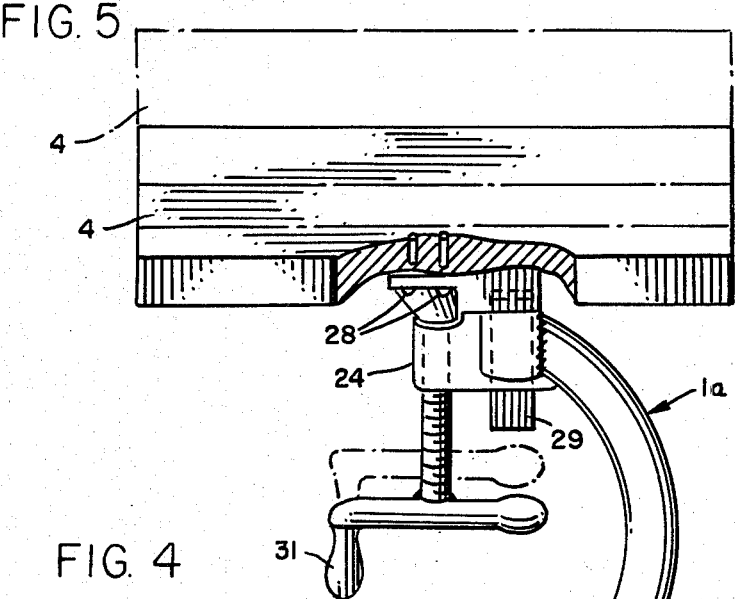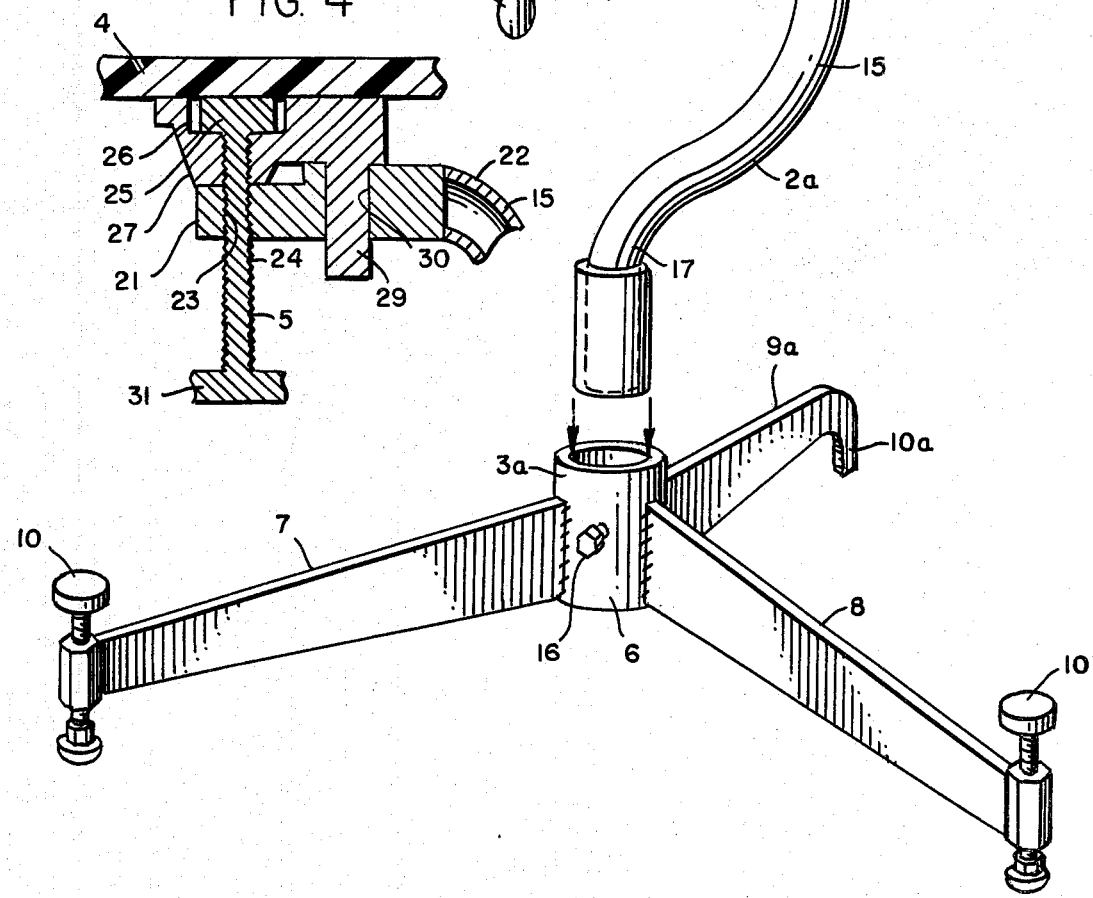

LIFTING JACK

BACKGROUND OF THE INVENTION

This invention relates to lifting jacks and, more particularly, to lifting jacks that are particularly well adapted for lifting and supporting cabinets and the like for attachment to a wall surface.

Heretofore, when cabinets have been installed and attached to a wall surface, it has commonly required the services of two or more people because one or more persons were requires to support the cabinet in proper position while the other person secured or attached the cabinet to the wall to which it was to be supported. Thus, it is an important object of the present invention to enable such wall cabinets and the like to be installed by a single person.

Jacks, of course, have been heretofore known in the art being shown, for example, in U.S. Pat. Nos. 1,192,611, issued to W. A. Field; 2,810,824, issued to P. Kaufman; 2,823,958, issued to C. W. Terry; 3,606,254, issued to O. W. Olson and 3,642,243, issued to Smith Eugene. However, it is an important object of the present invention to afford a novel jack for lifting and supporting wall cabinets, and the like, which constitutes improvements over such jacks known in the art.

SUMMARY OF THE INVENTION

A primary object of the present invention is to afford a novel lifting jack which is particularly well adapted for lifting and supporting cabinets and the like for attachment to a wall surface.

Another object of the present invention is to make the installation and hanging of wall cabinets more efficient and easier, even when more than one person is being used in the operation.

Yet another object of the present invention is to afford a novel jack of the aforementioned type which is quickly and easily adjustable to various heights and which is adapted for use on uneven supporting surfaces.

A further object of the present invention is to afford a novel jack of the aforementioned type, the height of which may be accurately adjusted to the desired height.

Another object of the present invention is to afford a novel jack of the aforementioned type which is practical and efficient in operation, and which may be readily and economically produced.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front elevation view of a jack embodying the principles of the present invention;

FIG. 2 is an enlarged, fragmentary, side elevational view of the upper portion of the jack shown in FIG. 1;

FIG. 3 is an enlarged, fragmentary, front elevational view of a portion of the jack shown in FIG. 1;

FIG. 4 is a fragmentary, detail sectional view taken substantially along the line 4—4 in FIG. 1; and FIG. 5 is a side, perspective view of a further embodiment of the jack shown in FIGS. 1-4.

DETAILED DESCRIPTION

Referring now to the drawings wherein like numerals have been used throughout the several views to designate the same or similar parts, a lifting jack assembly 1 in accordance with one embodiment of the present invention is shown in FIGS. 1-4.

In general, the lifting jack 1 includes an elongated standard 2 disposed in substantially upright position on a base 3 and having a platform 4 adjustably connected to the upper end portion of the standard 2 by an adjustment means or member 5.

The base 3 includes an elongated, tubular central body portion 6 disposed in substantially upright position at the inner ends of three legs 7, 8 and 9, which project radially outward therefrom in substantially equally spaced relation therearound. Each of the legs 7, 8 and 9 may include an adjustment member 10 mounted in the outer end portion thereof, and vertically adjustable relative thereto for leveling, or adjusting the position of the base 3. Although it is preferred to have each leg include an adjustment member 10, it is only necessary that two of the legs include an adjustment member for proper leveling of the jack assembly 1. As shown in FIG. 3, each of the adjustment members 10 embodies an elongated bolt 11 threadedly engaged in the outer end portions 33, 34 and 35 of a respective one of the legs 7, 8 and 9, with each of the bolts 11 having a foot or base portion 12 disposed at the lower end thereof for engaging the floor or other supporting surface on which the base 3 is mounted, and a knob 13 mounted on the upper end portion thereof for rotating the bolt 11 to thereby adjust the vertical position thereof in the respective one of the legs 7, 8 and 9.

The elongated standard 2 embodies a lower end portion or member 14 and an upper end portion or member 15, which are releasably and adjustably connected together in a manner which will hereinafter be discussed in greater detail. The lower end portion 14 of the standard 2 is a substantially straight tubular member having an outside diameter of such size that the lower end portion thereof may be disposed in the body portion 6 of the base 3 with a relatively snug, but freely slidable fit. A bolt 16 is threaded into and extends through the sidewall of the body portion 6 of the base 3 in such position that it may be rotated into and out of the body portion 6 and into and out of abutting, securing relation to the portion of the lower end portion 14 of the standard 2 disposed in the base 3.

The upper end portion 15 of the standard 2 embodies a lower end 17 (FIG. 2) which is of such external size or cross-section that it may be received in the upper end portion of the lower end portion 14 of the standard 2 with a snug, but freely slidable fit. Lower end 17 may be of substantially the same length as the standard 2 to provide maximum extended length of the jack 1 or a proportionally shorter length thereof, as desired. A bolt 18 is fitted into a nut 19, mounted on and secured to the outer face of the sidewall of the lower end portion 14, the bolt 18 extending through the lower end portion 14 of the standard 2 in position to be moved into and out of abutting relation with the lower end portion 17 of the upper end portion 15 of the standard 2 upon rotation of the bolt 18. A handle 20 preferably is mounted on the outer end portion of the bolt 18 for facilitating rotation of the bolt 18.

The upper end portion 15 of the standard 2 includes an upper end member 21, connected to the lower end portion 17 by an intermediate portion 22, FIG. 2. The upper end member 21 includes an internally threaded bore 23, FIG. 4, extending substantially vertically therethrough in axial alignment with the lower end 17 of the upper end portion 14.

The adjustment member 5 embodies a bolt or feed screw 24 extending through and threadedly engaged with the bore 23 in the end portion member 21, the feed screw 24 having an enlarged head 25 on the upper end portion thereof, which is rotatably mounted in an upwardly opening recess 26 in the upper face of a connector member 27, FIG. 4, the connector member 27 being secured to the lower face of the platform 4 by suitable means such as bolts or screws 28, FIG. 2, to thereby retain the head 25 of the feed screw 24 in the recess 26. The connector member 27 has an elongated member or shaft 29 projecting downwardly therefrom in parallel relation to the feed screw 24, and extending through an opening 30 in the upper end 21 of the upper end portion 15 of the standard 2, FIG. 4, for preventing rotation of the platform 4 around, or with the feed screw 24 relative to the standard 2. Rotation of the feed screw 24 relative to the bore 23 in opposite directions is effective to raise and lower the feed screw 24 and the elongated member 29 in the bores 23 and 30, respectively, between raised and lowered positions, such as, for example, the positions shown in broken and solid lines, respectively in FIG. 2. A member, preferably in the form of a handle 31, is mounted on the lower end of the feed screw 24 for effecting such rotation of the latter and thereby adjusting the vertical position of the platform 4 relative to the standard 2.

In the lifting jack assembly 1, the bore 23 and the feed screw 24 preferably extend through the end 21 of the upper end portion 15 of the standard 2 in axial alignment with the lower end 17 of the upper end portion 15 and with the lower end portion 14 of the standard 2, FIG. 2. The intermediate portion 22 of the upper end portion 15 of the standard 2 is offset laterally relative to the upper end 21 and lower end 17 of the upper end portion 15, as well as to the handle 31, to thereby permit the handle 31 to be readily rotated for manually turning the feedscrew 24 in the bore 23. However, it will be seen that, even with the intermediate portion 22 of the upper end portion 15 of the standard 2 thus disposed in laterally outwardly projecting position, with the upper end 21 and the lower end 17 of the upper end portion 15 of the standard 2 disposed in substantially vertical, axial alignment with each other and with the lower end portion 14 of the standard 2, a stable, balanced support for the platform 4 is afforded.

As will be appreciated by those skilled in the art, with the lifting jack 1 constructed in the aforementioned manner, a readily operable effective lifting jack is afforded for supporting and raising and lowering articles, such as, for example, cabinets and the like, and such operation may be readily effected by one person.

Thus, for example, if the jack 1 is to be used to support a wall cabinet, or the like, in position to be secured to a wall, the handle 20 may be turned to release the engagement of the screw 18 with the upper end portion 15 of the standard 2 and thereby permit the upper end portion 15 of the standard 2, together with the platform 4 mounted thereon, to be raised or lowered to the appropriate desired position of the platform 4. The cabinet, not shown, may then be disposed on the platform 4 in position to be supported thereby and by rotating one or more of the members 10 on the base 3, the position of the base 3 relative to the underlying supporting surface may be adjusted to thereby dispose the platform 4, and, therefore, the cabinet, not shown, in the desired position relative to the horizontal.

Thereafter, the handle 31, and, therefore, the feed screw 24, may be rotated in the proper direction to thereby raise or lower the feed screw 24 and the platform 4, relative to the standard 2, to thus position the platform 4 and the cabinet, or the like, disposed thereon at the proper elevation with respect to the wall surface. Then the user may readily use the selected tool or drill from the tool or drill holder 38, which is conveniently mounted on the standard 2, to secure the cabinet onto the wall surface. After the cabinet has been secured to the wall surface, the handle 31 may be rotated to lower the platform 4 out of supporting relation to the cabinet, and the lifting jack 1 may be removed for use with another cabinet.

In FIG. 5, a modified form of the present invention is shown, and parts which are the same as parts shown in FIGS. 1-4 are indicated by the same reference numerals, and parts which are similar to but are different from parts shown in FIGS. 1-4 are indicated by the same reference numerals with the suffix "a" added thereto.

Thus, it will be seen that in FIG. 5, a lifting jack 1a is shown, which is substantially the same in construction as the jack 1, shown in FIGS. 1-4, except that the lower portion 14 of the standard 2 has been eliminated and one leg 9a of the base 3a does not have an adjustable member 10 mounted thereof but, instead, has a stationery member 10a, which may be an integral part of the leg 9a, disposed thereon.

The jack 1a is intended for use, primarily, in operations where the bottom of the cabinet, or the like, being installed, is not disposed a substantial distance above the supporting surface, or where the relatively extensive vertical adjustment afforded between the end portions 14 and 15 of the standard 2 are not necessary, such as, for example, when a cabinet is being installed above a previously installed cabinet.

In the operation of the jack 1a, the base 3a may be disposed on the available supporting surface, such as, for example, the top of a previously installed cabinet, and the end portion 17 of the standard 2a may be mounted directly into the body portion 6 of the base 3a, and secured in position therein by tightening the bolt 16. Thereafter, the cabinet, or the like, may be mounted on top of the platform 4, and the level thereof adjusted by adjusting the adjustment members 10 in the legs 8 and 9 to the necessary position. The handle 31 may then be turned in the proper direction to rotate the screw 24 and raise or lower the platform 4 to thereby dispose the cabinet, or the like, at the desired elevation above the supporting surface on which the base 3a is mounted. After the cabinet, or the like, has been secured in position, the platform 4 may be lowered out of engagement therewith by rotation of the handle 31 in the proper direction and the lifting jack 1a may be removed from the proximity of the latter.

From the foregoing, it will be seen that the present invention affords a novel lifting jack which is particularly well adapted for use in operations such as, for example, supporting wall cabinets, and the like, in proper position, during installation operations relative thereto.

In addition, it will be seen that the present invention affords a novel lifting jack which enables a single user to support and install articles, such as, for example, wall cabinets. Also, it will be seen that the present invention affords a novel lifting jack which is practical and efficient in operation, and which may be readily and economically produced commercially.

Thus, while I have illustrated and described the preferred embodiments of my invention, it is to be understood that these are capable of variation and modification, and I therefore do not wish to be limited to the precise details set forth, but desire to avail myself of such changes and alterations as falls within the purview of the following claims.

I claim:
1. A lifting jack comprising
   a. a base,
   b. an elongated standard having
      (1) an elongated, substantially straight, tubular lower end portion,
      (2) an elongated, upper end portion having a lower end slidably mounted in the upper end of said lower end portion for vertical adjustment of said upper end portion relative to said lower end portion, and
      (3) an abutment member threaded into said lower end portion and abuttingly engaged with said upper end portion for holding said upper and lower end portions in vertically adjusted position to each other,
   c. said upper end portion also having
      (1) an upper end, and
      (2) an intermediate portion disposed between said upper and lower ends of said upper end portion and curved arcuately and offset laterally from said upper end and said lower end,
   d. an elongated feed screw extending through said upper end of said upper end portion,
   e. said feed screw having
      (1) an upper end disposed above said upper end of said upper end portion,
      (2) a lower end disposed below said upper end of said upper end portion, and
      (3) an intermediate portion
         (a) disposed between said upper and lower ends thereof, and
         (b) threadedly engaged with said upper end of said upper end portion,
   f. a platform mounted on and rotatably connected to said upper end of said feed screw, and
   g. means on said lower end of said feed screw for rotating said feed screw relative to said upper end of said upper end portion and within said curved arcuately intermediate portion and thereby moving said feed screw and platform relative to said standard, and
   h. said feed screw, said upper and lower ends of said upper end portion, and said lower end portion being disposed in substantially axial alignment therewith.

2. A lifting jack in accordance with claim 1, and in which
   a. said platform is secured against rotation relative to said standard, and
   b. said base includes bolt means for adjusting the position of said base relative to the horizontal and thereby adjusting the position of said standard relative to the vertical.

3. A lifting jack assembly including in combination
   a. a base
   b. an elongated standard disposed in substantially upright position on said base, said elongated standard having a lower end portion and an upper end portion adjustable vertically relative to said base with said upper end portion including an upper end, lower end and an intermediate portion disposed between said upper end and said lower end, with said lower end movably mounted in said lower end portion for vertically adjusting said upper end portion relative to the lower end portion and said intermediate portion is arcuately curved and offset laterally from said upper and lower ends of said upper end portion,
   c. an adjustment member mounted in said upper end and adjustable vertically relative thereto, said adjustment member further including a handle means which is adopted to rotate within said arcuate curved intermediate portion,
   d. a platform mounted on said adjustment member and movable vertically therewith, and
   e. means for preventing rotation of said platform relative to said upper end portion.

4. A lifting jack in accordance with claim 3 wherein said upper and lower ends are disposed in substantially vertical alignment with each other, and with said lower end portion.

5. A lifting jack comprising
   a. a base
   b. an elongated standard disposed in substantially upright position on said base, said standard having an upper end portion adjustable vertically relative to said base, said upper end portion comprised of an upper end, a lower end, and an intermediate portion disposed between said upper end and said lower end, with said intermediate portion being arcuate curved and offset laterally from said upper end and said lower end,
   c. an adjustment member mounted in and extending through said upper end of said upper end portion with the upper end of said adjustment member disposed above said upper end of said upper end portion and the lower end of said adjustment member comprised of a handle means disposed below said upper end of said upper end portion for manually rotating within said arcuate curved intermediate portion for moving said adjustment member upwardly and downwardly through said upper end portion and wherein said intermediate portion is off-set laterally from said lower end of said adjustment member, and
   d. a platform mounted of said adjustment member and movable vertically therewith.

6. A lifting jack in accordance with claim 5 wherein said adjustment member is rotably mounted in said upper end of said upper end portion, and threadedly engaged with said upper end of said upper end portion for vertical movement relative thereto.

7. A lifting jack in accordance with claim 6 wherein
   a. said lower end of said adjustment member and said handle means thereon rotates said adjustment member relative to said upper end of said upper end portion, and
   b. an elongated member
      (1) is secured to said platform,
      (2) projects downwardly therefrom, and
      (3) is vertically slidably mounted in said upper end of said upper end portion in position to prevent rotation of said platform relative to said upper end portion.

* * * * *